US009624119B2

(12) United States Patent
Dotzauer et al.

(10) Patent No.: US 9,624,119 B2
(45) Date of Patent: Apr. 18, 2017

(54) ENHANCED CATALYST STABILITY IN ACTIVATED PEROXYGEN AND/OR ALKALINE DETERGENT FORMULATIONS

(71) Applicant: Ecolab USA Inc., St. Paul, MN (US)

(72) Inventors: David Dotzauer, St. Paul, MN (US); Thomas R. Mohs, Eagan, MN (US); Erin Hill, Stillwater, MN (US)

(73) Assignee: Ecolab USA Inc., St. Paul, MN (US)

( * ) Notice: Subject to any disclaimer, the term of this patent is extended or adjusted under 35 U.S.C. 154(b) by 34 days.

(21) Appl. No.: 14/303,700

(22) Filed: Jun. 13, 2014

(65) Prior Publication Data
US 2015/0361383 A1    Dec. 17, 2015

(51) Int. Cl.
| C11D 1/00 | (2006.01) |
| C11D 3/39 | (2006.01) |
| C11D 3/395 | (2006.01) |
| C11D 3/28 | (2006.01) |
| C11D 3/37 | (2006.01) |
| C02F 1/72 | (2006.01) |
| B01J 31/22 | (2006.01) |
| C11D 3/04 | (2006.01) |
| C11D 3/08 | (2006.01) |
| C11D 3/10 | (2006.01) |
| C11D 7/06 | (2006.01) |
| C11D 7/12 | (2006.01) |
| C11D 7/14 | (2006.01) |
| C11D 17/00 | (2006.01) |
| D21C 9/10 | (2006.01) |
| D21C 9/16 | (2006.01) |
| D21H 17/00 | (2006.01) |
| D21H 17/37 | (2006.01) |
| D21H 17/64 | (2006.01) |
| C02F 1/68 | (2006.01) |

(52) U.S. Cl.
CPC ........... C02F 1/722 (2013.01); B01J 31/2295 (2013.01); C11D 3/044 (2013.01); C11D 3/08 (2013.01); C11D 3/10 (2013.01); C11D 3/3761 (2013.01); C11D 3/3776 (2013.01); C11D 3/3932 (2013.01); C11D 3/3935 (2013.01); C11D 7/06 (2013.01); C11D 7/12 (2013.01); C11D 7/14 (2013.01); C11D 17/0039 (2013.01); C11D 17/0047 (2013.01); C11D 17/0052 (2013.01); D21C 9/1036 (2013.01); D21C 9/1078 (2013.01); D21C 9/163 (2013.01); B01J 2231/70 (2013.01); B01J 2531/72 (2013.01); C02F 1/683 (2013.01); C02F 1/725 (2013.01); C02F 2303/02 (2013.01); C02F 2305/04 (2013.01); C11D 1/00 (2013.01); D21H 17/37 (2013.01); D21H 17/64 (2013.01); D21H 17/74 (2013.01)

(58) Field of Classification Search
CPC .... C11D 1/00; C11D 3/08; C11D 3/10; C11D 3/044; C11D 3/3917; C11D 3/392; C11D 3/3942; C11D 17/0047; C11D 17/06; B08B 3/04
USPC ....... 510/302, 311, 349, 376, 441, 445, 446, 510/509, 511; 8/111, 137; 134/25.2, 42; 252/186.26, 186.27
See application file for complete search history.

(56) References Cited

U.S. PATENT DOCUMENTS

| 4,430,243 | A | 2/1984 | Bragg |
| 4,478,733 | A | 10/1984 | Oakes |
| 4,623,357 | A | 11/1986 | Urban |
| 4,728,455 | A | 3/1988 | Rerek |
| 5,194,416 | A | 3/1993 | Jureller et al. |
| 5,227,084 | A | 7/1993 | Martens et al. |
| 5,246,612 | A | 9/1993 | Van Dijk et al. |
| 5,356,554 | A | 10/1994 | Delwel et al. |
| 5,409,627 | A | 4/1995 | Boskamp et al. |
| 5,429,769 | A | 7/1995 | Nicholson et al. |
| 5,480,575 | A | 1/1996 | Altieri et al. |
| 5,536,441 | A | 7/1996 | Chapple et al. |
| 5,703,034 | A | 12/1997 | Offshack et al. |
| 8,486,881 | B2 | 7/2013 | Borchers et al. |
| 2004/0266641 | A1 | 12/2004 | Gentschev et al. |
| 2012/0070554 | A1 | 3/2012 | Dournel |

FOREIGN PATENT DOCUMENTS

| CA | 2066871 | | 10/1996 |
| CA | 2822012 | A1 | 6/2012 |
| EP | 0141470 | A2 | 5/1985 |
| EP | 0509787 | B1 | 10/1992 |
| EP | 0510761 | A1 | 10/1992 |
| EP | 0510761 | B1 | 10/1992 |
| EP | 0544440 | A1 | 6/1993 |
| EP | 0544490 | A2 | 6/1993 |
| EP | 0544519 | B1 | 6/1993 |

(Continued)

OTHER PUBLICATIONS

"Pegasus Chloride 50" Product Data Sheet, Catexel Limited, 2 pages. Aug. 30, 2012.
EP 2106437 B1—Henkel—English Translation May 2, 2012.
PCT, "International Search Report and Written Opinion", issued in connection to International Application No. PCT/US2015/035350, 13 pages, mailed Sep. 11, 2015.

Primary Examiner — Gregory R Delcotto
(74) Attorney, Agent, or Firm — McKee, Voorhees & Sease, PLC

(57) ABSTRACT

Stabilized catalyst detergent compositions are provided in solid formulations of detergents including an active oxygen source and/or a highly alkaline detergent composition. The compositions are suitable for use with additional detergent and/or bleaching compositions while providing stabilized catalysts within a polymeric matrix. Methods or process for manufacturing the compositions, and methods of use for cleaning are disclosed.

18 Claims, 3 Drawing Sheets

(56) References Cited

FOREIGN PATENT DOCUMENTS

| | | |
|---|---|---|
| EP | 0549271 A1 | 6/1993 |
| EP | 0549272 A1 | 6/1993 |
| EP | 0693550 A2 | 1/1996 |
| EP | 0458397 B1 | 3/1997 |
| EP | 0458398 B1 | 3/1997 |
| EP | 1360268 B1 | 11/2003 |
| EP | 1499702 B1 | 1/2005 |
| EP | 2106437 B1 | 5/2012 |
| WO | 9421777 A1 | 9/1994 |
| WO | 9506710 A1 | 3/1995 |
| WO | 9606154 A1 | 2/1996 |
| WO | 9722680 A1 | 6/1997 |
| WO | 03072688 A1 | 9/2003 |
| WO | 2009040545 A1 | 4/2009 |
| WO | 2010115582 A1 | 10/2010 |
| WO | 2010139689 A1 | 12/2010 |
| WO | 2012085534 A1 | 6/2012 |

ENHANCED CATALYST STABILITY IN ACTIVATED PEROXYGEN AND/OR ALKALINE DETERGENT FORMULATIONS

CROSS-REFERENCE TO RELATED APPLICATIONS

This application is related to U.S. patent application Ser. No. 14/303,706 filed simultaneously herewith and entitled Enhanced Catalyst Stability for Alkaline Detergent Formulations. The entire contents of this patent application are hereby expressly incorporated herein by reference including, without limitation, the specification, claims, and abstract, as well as any figures, tables, or drawings thereof.

FIELD OF THE INVENTION

The invention relates to stabilized compositions employing a coating of a polymer matrix to impart shelf stability of detergent compositions containing a peroxygen source and a catalyst activator. Similarly, stabilized compositions may employ a coating to impart shelf stability of detergent compositions containing highly alkaline detergents and the catalyst activator. In particular, the catalyst activator is coated by a polymer matrix made of a polyacrylate material to prevent premature reaction with the peroxygen source during storage and/or transportation, thereby allowing both reactive components to be formulated into a single detergent block composition. Methods of formulating and use are further provided and include the dissolution of the polyacrylate coating during use in cleaning applications while maintaining effective cleaning performance.

BACKGROUND OF THE INVENTION

The use of active oxygen sources (e.g. peroxide) with a transition metal catalyst is known to improve bleaching performance; see for example U.S. Pat. No. 5,246,612. The improved efficacy for bleaching is beneficial for removing stains such as tea and/or coffee as well as starch soils on wares. However, the delivery of both an active oxygen source and a catalyst material in a single detergent formulation suffers from numerous stability challenges. In particular, the catalyst and active oxygen source, such as hydrogen peroxide, react when mixed together.

The use of coatings and/or encapsulation of particulate materials has been used for bleaching catalyst granules to increase stability; see for example, GB2428694, WO 03/093405 and WO 02/06659. Similarly, agglomerated forms have been disclosed in EP0072116 and EP0124341, and granules have been disclosed in EP544440, WO 1994021777, WO1995006710 and EP141470. The use of granular detergent products (e.g. formulations for consumer detergent use, see for example U.S. Pat. No. 5,703,034) has been used to incorporate bleach catalysts directly into a granular detergent product; however, stability concerns remain for formulating solid and/or multi-use detergent compositions containing catalysts. Therefore, when formulating solid block compositions there is a need for further stability and segregation of catalysts from the alkaline detergents and/or peroxygen sources therein.

In addition, prior compositions have stabilized catalysts using water soluble ligands or complexing agents, including for example EDTA, DTPA, NTA, and alkaline metal and alkaline earth metal salts, along with alkaline metal tryphosphates and the like, such as disclosed in EP10141470. Such compositions form water and soluble salts with the manganese to attempt to prevent release of magnesium dioxide. Further, use of biopolymers and polysaccharides, including starches is disclosed for use in stabilizing catalysts in U.S. Pat. No. 5,480,575. Sugars, such as mannitol are disclosed in EP2655588 for use with sulfonated polymers as coating materials for catalysts.

However, such methods do not overcome difficulties in use of catalysts, such as instability of oxygen sources and catalysts upon storage. A further disadvantage with encapsulates and granules is that they are generally bound to certain particle size constraints. An additional problem associated with such coatings and/or encapsulation is that the materials providing the protection may themselves have an adverse interaction with the component to be protected. Therefore, in some products stability has been increased by removing any easily oxidisable materials from the compositions. However, there remains a need to increase the shelf life of a combination product containing an oxidant and a catalyst to prevent the reaction of the active components.

The shelf life of a cleaning product may be regarded as the period of time over which the product may be stored while retaining its required performance efficacy. A satisfactory shelf life is in many instances a crucial factor for the success of a commercial product. A product with a short shelf life generally dictates that the product is made in small batches and is rapidly sold to the consumer. Beneficially, products with a longer shelf life may be made in larger batches, maintained in storage for a longer period of time and/or maintained by a consumer for a longer period of time before use. Accordingly, it is an objective of the claimed invention to develop detergents having increased shelf life and stability when employing reactive components, such as peroxygen sources and catalysts.

It is an object of the present invention to mitigate the problems outlined above and/or to further improve the stability of particulate material comprising a bleach catalyst.

A further object of the invention is to incorporate a solid peroxygen source (e.g. sodium percarbonate) into a solid detergent block with a catalyst material while overcoming poor available oxygen and catalyst stability as experienced in the prior art, including at elevated storage temperatures.

A further object of the invention is to provide methods of protection and/or coating a catalyst material in a solid detergent block with a polyacrylate polymer matrix to prevent reaction with an active oxygen source (e.g. peroxygen source).

Other objects, advantages and features of the present invention will become apparent from the following specification taken in conjunction with the accompanying drawings.

BRIEF SUMMARY OF THE INVENTION

An advantage of the invention is an improved shelf stability of detergent compositions containing either a peroxygen source or a highly alkaline detergent and a catalyst activator. It is an unexpected benefit of the present invention that a catalyst activator is coated with a polymer matrix made of a polyacrylate material to prevent premature reaction with the detergent formulation in a solid block containing the peroxygen source and/or high alkaline detergent formulation. Beneficially, the storage and/or transportation stability of the compositions are significantly increased by the polyacrylate encapsulation allowing both reactive components to be formulated into a single detergent block composition.

In an embodiment, the present invention provides solid stabilized catalyst detergent compositions. The compositions include: at least one alkalinity source and a stabilized catalyst comprising a polymeric matrix of a polymer and a catalyst. In an aspect, the catalyst has the following formula: $[(L_pMn_q)_nX_r]Y_s$ wherein each L independently is an organic ligand containing at least three nitrogen atoms and/or at least two carboxyl groups that coordinate with the Mn metal; wherein each X independently is a coordinating or bridging group selected from the group consisting of $H_2O$, $OH^-$, $SH^-$, $HO_2^-$, $O^{2-}$, $O_2^{2-}$, $S^{2-}$, $F^-$, $Cl^-$, $Br^-$, $I^-$, $NO_3^-$, $NO_2^-$, $SO_4^{2-}$, $SO_3^{2-}$, $PO_4^{3-}$, $N_3^-$, $CN^-$, $NR_3$, $NCS^-$, $RCN$, $RS^-$, $RCO_2^-$, $RO^-$, and

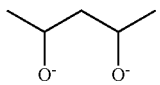

wherein R is a hydrogen or a $C_1$ to $C_6$ alkyl group; wherein p is an integer from 1 to 4; wherein q is an integer from 1 to 2; wherein r is an integer from 0 to 6; wherein Y is a counter ion; and wherein s is the number of counter ions. In some aspects, the polymer is a water-soluble carboxylate having a molecular weight between about 1,000 to 10,000. In some aspects, the carboxylate is an acrylic acid/maleic acid copolymer, an acrylic acid polymer or combinations thereof. In some aspects the polymer is polyvinylpyrrolidone. In some aspects, the alkalinity source is selected from the group consisting of alkali metal hydroxides, alkali metal carbonates, alkali metal silicates, alkali metal metasilicates, alkali metal bicarbonates, alkali metal sesquicarbonates, and combinations thereof. In some aspects, the detergent composition also includes an active oxygen source that is catalyzed by the catalyst in a use solution of the composition. In some aspects, the active oxygen source is sodium percarbonate.

In a further embodiment, the present invention provides methods of making a solid stabilized catalyst detergent composition. The methods include: providing a polymer in a solvent, wherein the polymer is a carboxylate; providing a catalyst in a solvent, wherein the catalyst has the following formula: $[(L_pMn_q)_nX_r]Y_s$, wherein each L independently is an organic ligand containing at least three nitrogen atoms and/or at least two carboxyl groups that coordinate with the Mn metal; wherein each X independently is a coordinating or bridging group selected from the group consisting of $H_2O$, $OH^-$, $SH^-$, $HO_2^-$, $O^{2-}$, $O_2^2$, $S^{2-}$, $F^-$, $Cl^-$, $Br^-$, $I^-$, $NO_3^-$, $NO_2^-$, $SO_4^{2-}$, $SO_3^{2-}$, $PO_4^{3-}$, $N_3^-$, $CN^-$, $NR_3$, $NCS^-$, $RCN$, $RS^-$, $RCO_2^-$, $RO^-$, and

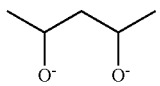

wherein R is a hydrogen or a $C_1$ to $C_6$ alkyl group; wherein p is an integer from 1 to 4; wherein q is an integer from 1 to 2; wherein r is an integer from 0 to 6; wherein Y is a counter ion; and wherein s is the number of counter ions; and combining the polymer and catalyst to form a solution. The methods further include drying the solution of the polymer and catalyst to form a stabilized catalyst polymeric matrix, and thereafter solidifying the stabilized catalyst polymeric matrix with at least one alkalinity source to form a hydrate solid detergent composition.

In a still further embodiment, the present invention provides methods of cleaning and/or bleaching comprising: providing the solid stabilized catalyst detergent compositions; generating a use solution; and contacting a surface or object in need of cleaning and/or bleaching with the use solution of the detergent composition.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
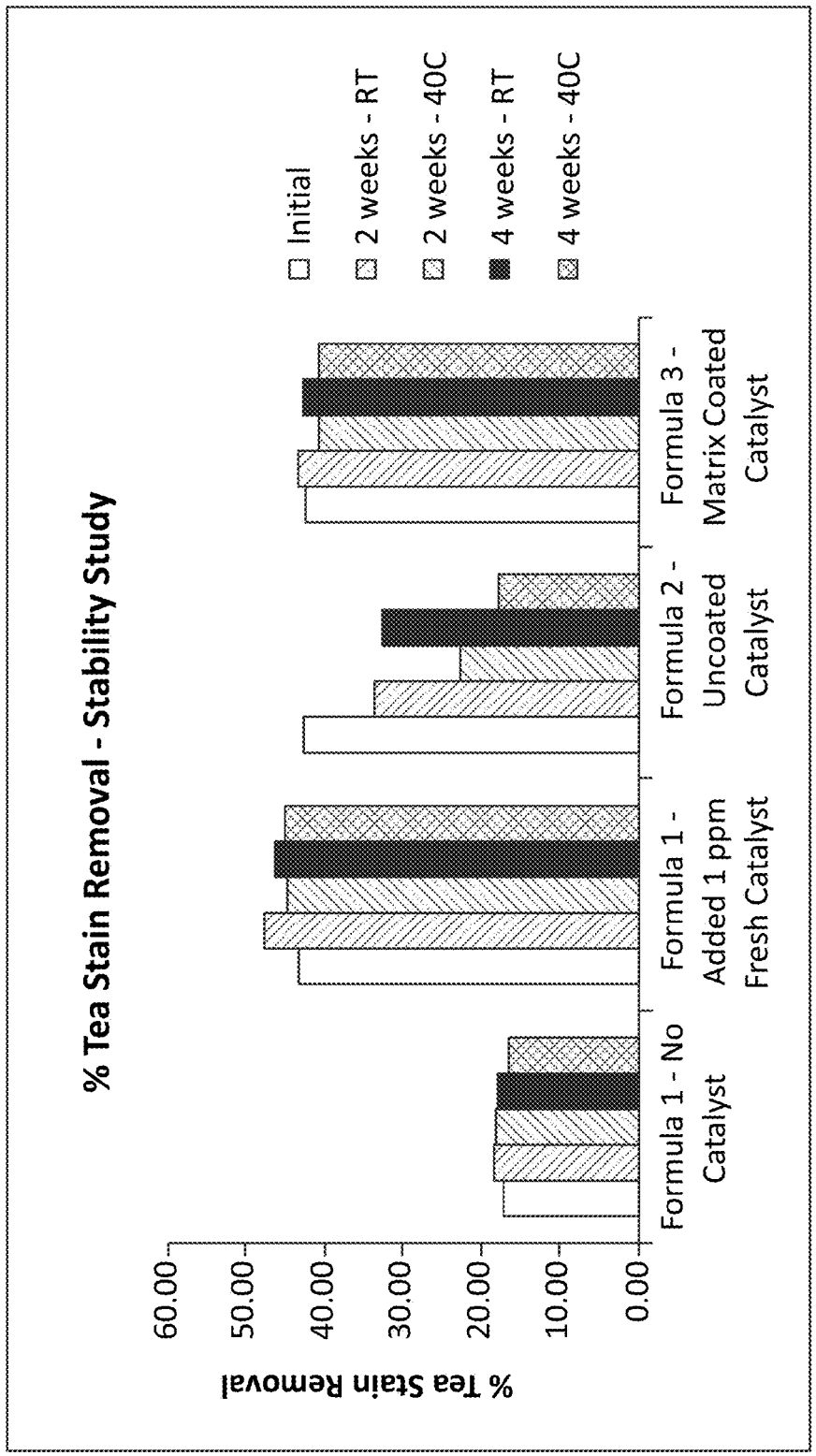
FIGS. 1-3 show the percentage of tea stain removal from stability studies (at two weeks and four weeks) of various formulations with and without the catalyst material demonstrating the efficacy of the polymer matrix coating according to embodiments of the invention.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The embodiments of this invention are not limited to particular detergent formulations employing the polyacrylate polymer matrix for coating to enhance product stability, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism. For the purpose of this patent application, successful microbial reduction is achieved when the microbial populations are reduced by at least about 50%, or by significantly more than is achieved by a wash with water. Larger reductions in microbial population provide greater levels of protection.

Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbistatic. A sanitizer and a disinfectant are, by definition, agents which provide antimicrobial or microbiocidal activity. In contrast, a preservative is generally described as an inhibitor or microbistatic composition As used herein, the term "sanitizer" refers to an agent that reduces the number of bacterial contaminants to safe levels as judged by public health requirements. In an embodiment, sanitizers for use in this invention will provide at least a 3 log reduction and more preferably a 5-log order reduction. These reductions can be evaluated using a procedure set out in *Germicidal and Detergent Sanitizing Action of Disinfectants*, Official Methods of Analysis of the Association of Official Analytical Chemists, paragraph 960.09 and applicable sections, 15th Edition, 1990 (EPA Guideline 91-2). According to this reference a sanitizer should provide a 99.999% reduction (5-log order reduction) within 30 seconds at room temperature, 25±2° C., against several test organisms.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polycarbonate polymers (PC), acrilonitrile-butadiene-styrene polymers (ABS), and polysulfone polymers (PS). Another exemplary plastic that can be cleaned using the compounds and compositions of the invention include polyethylene terephthalate (PET).

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Stabilized Catalyst Compositions

Exemplary ranges of the stabilized catalyst detergent compositions containing an active oxygen source according to the invention are shown in Table 1 in weight percentage of the solid detergent compositions.

TABLE 1

| Material | First Exemplary Range wt-% | Second Exemplary Range wt-% | Third Exemplary Range wt-% | Fourth Exemplary Range wt-% |
| --- | --- | --- | --- | --- |
| Alkaline Solidification Matrix (e.g. carbonate, silicate) | 10-80 | 20-70 | 30-60 | 30-50 |
| Stabilized Catalyst (e.g. polymer matrix and catalyst) | 0.1-15 | 0.1-10 | 1-5 | 2-5 |
| Active Oxygen Source (e.g. percarbonate) | 10-75 | 10-50 | 20-50 | 25-50 |
| Surfactants | 1-25 | 1-20 | 5-20 | 5-15 |
| Additional Functional Ingredients | 0-30 | 0.1-25 | 10-15 | 1-10 |

Exemplary ranges of the stabilized catalyst detergent compositions according to the invention are shown in Table 2 in weight percentage of the solid detergent compositions without the inclusion of an active oxidant.

TABLE 2

| Material | First Exemplary Range wt-% | Second Exemplary Range wt-% | Third Exemplary Range wt-% | Fourth Exemplary Range wt-% |
| --- | --- | --- | --- | --- |
| Alkaline Solidification Matrix (e.g. caustic and/or ash) | 10-90 | 20-80 | 25-70 | 30-60 |
| Stabilized Catalyst (e.g. polymer matrix and catalyst) | 0.1-15 | 0.1-10 | 0.5-5 | 1-5 |
| Surfactants | 1-50 | 5-45 | 10-45 | 15-45 |
| Additional Functional Ingredients | 0-30 | 0.1-25 | 1-20 | 1-15 |

In some aspects the ratio of the polyacrylate to the catalyst material is in a ratio of from about 90:10 to about 99.9:0.1, preferably a ratio of the polyacrylate to the active catalyst material from 20:1 to about 99:1. In some aspects the stabilized catalyst (provided in the form of a polymer matrix of the polyacrylate and catalyst) is in the amount from about 0.5 wt-% to about 10 wt-% in the solid detergent compositions, preferably from about 1 wt-% to about 5 wt-% in the solid detergent compositions. In addition, without being limited according to the invention, all ranges for the ratios recited are inclusive of the numbers defining the range and include each integer within the defined range of ratios.

The solid detergent compositions are preferably provided as concentrate compositions which may be diluted to form use compositions. In general, a concentrate refers to a composition that is intended to be diluted with water to provide a use solution that contacts an object to provide the desired cleaning, bleaching, or the like. The detergent composition that contacts the articles to be washed can be referred to as a concentrate or a use composition (or use solution) dependent upon the formulation employed in methods according to the invention. It should be understood that the concentration of the catalyst, active oxidant, polymers (e.g. polyacrylate), surfactants and other additional functional ingredients in the detergent composition will vary depending on solid concentrate provided and the desired use solution thereof.

In some aspects, the solid, stabilized catalyst detergent compositions maintain shelf stability for at least about 1 year at room temperature.

Polymeric Coating

The stabilized catalyst detergent compositions according to the invention include a polymeric coating providing a matrix with the catalyst. Beneficially, the polymeric matrix formed with the catalyst provides a method of protecting sensitive and reactive components (e.g. active oxygen sources) which eliminates problems associated with prior art systems. The polymeric coating according to the invention provides a polymeric matrix with the catalyst. In an aspect, the polymeric matrix provides a coating to protect the bleach catalysts, allowing its incorporation into a solid detergent formulation without incurring any problems of stability and/or integrity. Without wishing to be bound by theory or a particular mechanism of action, the polymeric coating forms a polymeric matrix structure with the catalyst and further surrounds the bleach catalyst creating a barrier for detrimental species such as aerial oxygen and/or water content of the solid formulation.

Suitable polymers for use herein are water-soluble. By water-soluble, it is meant herein that the polymers have solubility in water in the compositions according to the invention. In an aspect, water-soluble refers to polymers being soluble in water at about 25° C. at a concentration of at least about 1 wt-%, preferably at least about 5 wt-%, more preferably at least about 1-wt-% and most preferably at about 50-wt %.

In some aspects, the polymers have a neutral to acidic pH.

Suitable polymers for use herein have a molecular weight in the range of from 1,000 to 200,000, preferably from 1,000 to 150,000, preferably, more preferably from about 1,500 to 50,000, more preferably from about 1,000 to 10,000, and still more preferably from about 1,500 to 10,000.

Suitable polymers which meet the above criteria and are therefore particularly useful in the present invention include carboxylates. Suitable types of polymeric carboxylate include carboxylates/carboxylic acids such as polyacrylates/ polyacrylic acid and derivatives/copolymers thereof. In an aspect, the polymer for the polymeric matrix is a polyacrylate.

Suitable carboxylates include monomeric carboxylates/carboxylic acids such as; citric acid/citrate, maleic acid/maleate and derivatives thereof. Suitable polymeric polyols for coating include hydrolysed polyacetates (wherein a portion of the acetate moieties are hydrolysed to hydroxyl moieties, e.g. to polyvinyl alcohol) and derivatives thereof. In an aspect, the polymer for the polymeric matrix is polyvinylpyrrolidone (PVP).

Examples of non-limiting, commercially-available polyacrylates suitable for use according to the invention include Acusol® 448 (acrylic acid/maleic acid copolymer, 50% active) and Acusol® 445 (acrylic acid polymer, 45% active), available from Dow Chemical.

In aspects of the invention, the polymeric coating has a concentration in a solid, stabilized catalyst detergent compositions from about 0.01 wt-% to about 15 wt-%, from about 0.1 wt-% to about 15 wt-%, from about 0.1 wt-% to about 10 wt-%, or from about 0.5 wt-% to about 5 wt-% It is to be understood that all values and ranges between these values and ranges are encompassed by the invention.

Catalyst

The stabilized catalyst detergent compositions according to the invention include at least one catalyst. The term "catalyst," as used herein, refers to an agent, such as transition metals, used to activate a source of oxygen, such as a percarbonate, providing improved bleaching activity and/or bubbling of a use solution to provide enhanced cleaning efficacy. In an aspect, catalysts are suitable for converting or decomposing active oxygen sources (i.e. oxidation) to generate catalytically enhanced bleaching species. In an aspect of the invention, the catalyst is readily degraded and therefore is in need of the coating using the polymeric matrix according to the invention. For example, Mn(II) or Mn(III) are readily oxidized to form Mn(IV) species (turning to $MnO_2$), in particular when combined with oxidants and/or in an alkaline environment.

In an aspect of the invention, the catalyst agent is metallic. In a further aspect, the catalyst agent can include various forms of metallic agents, including transition metals, including for example manganese.

In some aspects, the catalyst agent includes at least once source of manganese. In some embodiments, the manganese source is derived from manganese metal, manganese oxides, colloidal manganese, inorganic or organic complexes of manganese, including manganese sulfate, manganese carbonate, manganese acetate, manganese lactate, manganese nitrate, manganese gluconate, or manganese chloride, or any of the salts of salt forming species with manganese. Exemplary manganese-gluconate complexes are described in EP0237111; manganese-bi-pyridylamine complexes are described in EP0392593; and manganese-polyol complexes are described in EP0443651, as peroxygen bleach catalysts.

Commercially-available manganese catalysts are sold under the tradename Dragon (also known as Dragon's Blood or Dragon A350) (bis(octahydro-1,4,7-trimethyl-1H-1,4,7-triazonine-$kN^1$, $kN^4$, $kN^7$)-tri-µ-oxo-Di[manganese(1+)] sulfate tetrahydrate) or tradename Pegasus (Di[manganese (1+)], 1,2-bis(octahydro-4,7-dimethyl-1H-1,4,7-triazonine-1-yl-$kN^1$, $kN^4$, $kN^7$)-ethane-di-µ-oxo-µ-(ethanoato-kO, kO')-, di[chloride (1−)]), available from Catexel Ltd.

In an aspect, the catalyst agent is a manganese-based complex that is a mononuclear or dinuclear complex of a Mn(III) or Mn(IV) transition metal. In a further aspect, the catalyst agent contains at least one organic ligand containing at least three nitrogen atoms that coordinate with the manganese. An exemplary structure is 1,4,7-triazacyclononane (TACN), 1,4,7-trimethyl-1,4,7-triazacyclononane (Me-TACN), 1,5,9-triazacyclododecane, 1,5,9-trimethyl-1,5,9-triazacyclododecane (Me-TACD), 2-methyl-1,4,7-triazacyclononane (Me/TACN), 2-methyl-1,4,7-trimethyl-1,4,7-triazacyclononane (Me/Me-TACN), N,N',N"-(2-hydroxyethyl)1,4,7-triazacyclononane. In a preferred embodiment, the ratio of the manganese atoms to the nitrogen atoms is 1:3.

Catalysts can also contain from 0 to 6 coordinating or bridging groups per manganese atom. When the manganese based catalyst is a mononuclear complex, coordinating groups are for example selected from —OMe, —O—CH$_2$—CH$_3$, or —O—CH$_2$—CH$_2$—CH$_3$. When the manganese based catalyst is a dinuclear complex, bridging groups may be selected, among others, from —O—, —O—O—, or —O—CH(Me)—O—. The catalyst can also contain one or more monovalent or multivalent counter ions leading to a charge neutrality. The number of such monovalent or multivalent counter ions will depend on the charge of the manganese complex which can be 0 or positive. The type of the counter ions needed for the charge neutrality of the complex is not critical and the counter ions may be selected for example from halides such as chlorides, bromides and iodides, pseudohalides, sulphates, nitrates, methylsulfates, phosphates, acetates, perchlorates, hexafluorophosphates, or tetrafluoro-borates.

The catalysts suitable for use according to the invention may be defined according the following formula: $[(L_pMn_q)_n X_r]Y_s$, wherein each L independently is an organic ligand containing at least three nitrogen atoms and/or at least two carboxyl groups that coordinate with the Mn metal; each X independently is a coordinating or bridging group selected from the group consisting of $H_2O$, $OH^-$, $SH^-$, $HO_2^-$, $O^{2-}$, $O_2^{2-}$, $S^{2-}$, $F^-$, $Cl^-$, $Br^-$, $I^-$, $NO_3^-$, $NO_2^-$, $SO_4^{2-}$, $SO_3^{2-}$, $PO_4^{3-}$, $N_3^-$, $CN^-$, $NR_3$, $NCS^-$, $RCN$, $RS^-$, $RCO_2^-$, $RO^-$, and

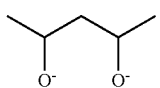

with R being hydrogen or a $C_1$ to $C_6$ alkyl group; p is an integer from 1 to 4; q is an integer from 1 to 2; r is an integer from 0 to 6; Y is a counter ion; and s is the number of counter ions.

The catalysts suitable for use according to the invention may also be defined according the following formula for a dinuclear manganese complex:

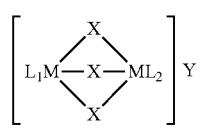

Wherein M is a Mn metal; $L_1$ and $L_2$ can either be separate ligands or where $L_1$ and $L_2$ can combine to be a single molecule. Among the coordinating or bridging groups, the groups $O^{2-}$, $O_2^{2-}$, $CH_3O-$, $CH_3CO^{2-}$,

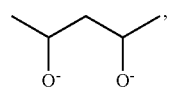

or Cl— are particularly preferred. In some aspects, the ligands are selected from the group consisting triazacyclononane, triazacyclononane derivatives, Schiff-base containing ligands, polypyridineamine ligands, pentadentate nitrogen-donor ligands, bispidon-type ligands, and macrocyclic tetraamidate ligands. Examples for those classes of ligands are described by R. Hage and A Lienke (Hage, Ronald; Lienke, Achim. Applications of Transition-Metal Catalysts to Textile and Wood-Pulp Bleaching. Angewandte Chemie International Edition, 2005, 45. Jg., Nr. 2, pp. 206-222), which is incorporated herein by reference in its entirety. Another group of preferred ligands are dicarboxylates, in particular oxalate.

Examples of catalyst structures that are particularly useful in the stabilized catalyst detergent compositions according to the invention include the following:

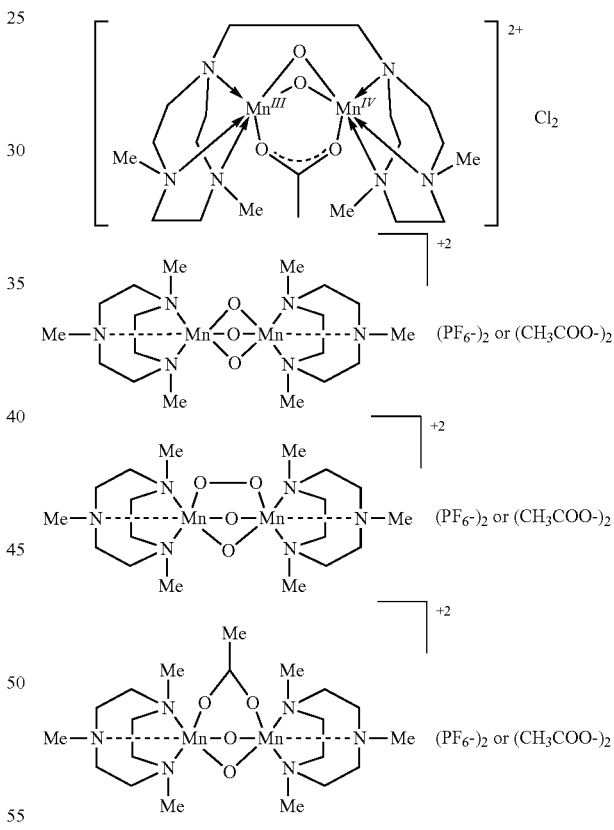

Additional disclosure of metal complexes for catalysts is provided for example, in U.S. Pat. Nos. 5,227,084, 5,194,416, 4,728,455, 4,478,733, and 4,430,243, and European Patent Nos. 693,550, 549,271, 549,272, 544,519, 544,490, 544,440, 509,787, 458,397 and 458,398, each of which is herein incorporated by reference in its entirety.

In aspects of the invention, the catalyst has a concentration in a solid, stabilized catalyst detergent compositions from about 0.001 wt-% to about 10 wt-%, from about 0.005 wt-% to about 1 wt-%, from about 0.01 wt-% to about 0.25 wt-%, or from about 0.01 wt-% to about 0.2 wt-%. It is to be understood that all values and ranges between these values and ranges are encompassed by the invention.

As one skilled in the art will ascertain from the description herein of the stabilized catalyst detergent compositions, the amounts of catalysts employed in the solid compositions is a relatively small quantity, including down to the hundredths of a percent, which are quantities much lower than bleach precursors which are often formulated into a detergent composition. Beneficially, the solid detergent formulations according to the invention providing the polymeric matrix of the polyacrylate material and the catalyst allow the formulation of the manganese-complex catalysts directly into the solid formulations and to be readily dissolved into a use solution of the stabilized catalyst detergent composition. This beneficially overcomes another limitation within the art which is the difficulty of accurately dosing the catalyst at the low dosages while also achieving a homogenous distribution of the catalyst throughout the detergent composition in a solution to provide sufficient efficacy within a use solution.

Active Oxygen Source

The stabilized catalyst detergent compositions according to the invention can include at least one active oxygen compound. The active oxygen sources suitable for use according to the invention can be inorganic or organic, and can be a mixture thereof.

Some examples of active oxygen compound include peroxygen compounds, peroxygen compound adducts, hydrogen peroxide, hydrogen peroxide liberating or generating compounds, and inorganic and organic peroxyacids. Many active oxygen compounds are peroxygen compounds, including for example hydrogen peroxide, group 1 (IA) active oxygen compounds (e.g., sodium peroxide), group 2 (IIA) active oxygen compounds (e.g., magnesium peroxide), group 12 (IIB) active oxygen compounds (e.g., zinc peroxide), group 13 (IIIA) active oxygen compounds (e.g., perborates), group 14 (IVA) active oxygen compounds (e.g., persilicates and peroxycarbonates), group 15 (VA) active oxygen compounds (e.g., perphosphates), group 16 (VIA) active oxygen compounds (e.g., peroxysulfuric acids and their salts), group 17 (VITA) active oxygen compounds (e.g., sodium periodate), and transition metal peroxides. Any of a variety of hydrogen peroxide and/or hydrogen peroxide adducts are suitable for use in the present invention.

Sodium percarbonate ($2Na_2CO_3 \cdot 3H_2O_2$) can also be employed as the active oxygen compound for the stabilized catalyst detergent compositions. Percarbonate is an alternative to solid peroxide for use in solid detergent formulations. Sodium percarbonate is commercially-available in the form of coated granulates to provide enhanced stability.

Active oxygen compounds, including organic active oxygen compounds may also include peroxycarboxylic acids, such as a mono- or di-peroxycarboxylic acid, an alkali metal salt including these types of compounds, or an adduct of such a compound.

Peracid, peroxyacid, percarboxylic acid and peroxycarboxylic acid each refer synonymously to acids having the general formula $R(CO_3H)_n$. The R group can be saturated or unsaturated as well as substituted or unsubstituted. As described herein, R is an alkyl, arylalkyl, cycloalkyl, aromatic, heterocyclic, or ester group, such as an alkyl ester group. N is one, two, or three, and named by prefixing the parent acid with peroxy. Ester groups are defined as R groups including organic moieties (such as those listed above for R) and ester moieties. Exemplary ester groups include aliphatic ester groups, such as $R_1OC(O)_2$, where each of $R_1$ and $R_2$ can be aliphatic, preferably alkyl, groups described above for R. Preferably $R_1$ and $R_2$ are each independently small alkyl groups, such as alkyl groups with 1 to 5 carbon atoms. As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups). Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups. In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

Sulfoperoxycarboxylic acid, sulfonated peracid, or sulfonated peroxycarboxylic acid each refer synonymously to the peroxycarboxylic acid form of a sulfonated carboxylic acid. Additional description of suitable peracids for use according to the invention is set forth, for example, in U.S. Patent Publication Nos. 2013/0047345 and 2013/0018099.

In aspects of the invention where an active oxygen source is included in the stabilized catalyst detergent compositions, the active oxygen source has a concentration in the solid, stabilized catalyst detergent catalyst detergent compositions from about 2 wt-% to about 75 wt-%, from about 10 wt-% to about 75 wt-%, from about 5 wt-% to about 50 wt-%, from about 10 wt-% to about 50 wt-%, or from about 25 wt-% to about 50 wt-%. It is to be understood that all values and ranges between these values and ranges are encompassed by the invention.

Alkalinity Sources

The solid stabilized catalyst detergent compositions of the present invention include at least one alkalinity source. In some aspects, the alkalinity source(s) function as a hydratable salt to form the solid compositions. In some aspects, the hydratable salt can be referred to as substantially anhydrous. As one skilled in the art will ascertain from the disclosure herein, there may also be included with the alkalinity source(s) in the solid detergent composition water of hydration to hydrate the alkalinity source(s). It should be understood that the reference to water includes both water of hydration and free water.

In some aspects, the alkalinity source(s) may include alkali metal hydroxides, alkali metal carbonates, and/or alkali metal silicates. Examples of suitable alkalinity sources include but are not limited to: sodium hydroxide, potassium hydroxide, sodium carbonate, potassium carbonate, sodium silicate, potassium silicate, a mixture of alkali metal hydroxides, a mixture of alkali metal carbonates, a mixture of alkali metal silicates, and any mixtures of the same. In additional aspects, the alkalinity source(s) may include alkali metal metasilicates, bicarbonates, sesquicarbonates, and mixtures thereof.

The alkalinity source(s) largely control the pH of the resulting solution when water is added to the detergent composition to form a use solution. In some aspects, the alkalinity source(s) provide a high alkaline detergent. In such aspects, The pH of the use solution is between approximately 10 and approximately 13 in order to provide sufficient detergency properties. In some aspects, the pH of the use solution is between about 10 and about 12. In other aspects, the alkalinity source(s) (e.g. sodium carbonate) provide a milder alkaline detergent, such as a pH greater than about 7; such as disclosed in U.S. Pat. No. 7,094,746, which is incorporated herein by reference in its entirety. Beneficially, the stabilized catalyst detergent compositions can be formulated into alkaline and/or highly alkaline detergent compositions while still protecting the catalyst material.

In aspects of the invention the alkalinity sources are included in the solid stabilized catalyst detergent compositions, at a concentration of from about 10 wt-% to about 90 wt-%, from about 25 wt-% to about 90 wt-%, from about 30 wt-% to about 90 wt-%, from about 10 wt-% to about 80 wt-%, from about 20 wt-% to about 80 wt-%, from about 30 wt-% to about 80 wt-%, from about 25 wt-% to about 70 wt-%, from about 30 wt-% to about 80 wt-%, from about 30 wt-% to about 70 wt-%, from about 30 wt-% to about 60 wt-%, from about 30 wt-% to about 50 wt-%, and from about 40 wt-% to about 75 wt. It is to be understood that all values and ranges between these values and ranges are encompassed by the invention.

Surfactants

In some embodiments, the compositions of the present invention include a surfactant or surfactant system. A variety of surfactants can be used in a detergent compositions, including, but not limited to: anionic, nonionic, cationic, and zwitterionic surfactants. Exemplary surfactants that can be used are commercially available from a number of sources. For a discussion of surfactants, see for example, Kirk-Othmer, Encyclopedia of Chemical Technology, Third Edition, volume 8, pages 900-912, "Surface Active Agents and Detergents," Vol. I and II by Schwartz, Perry and Berch, each of which are herein incorporated by reference in its entirety.

Non-limiting examples of anionic surfactants useful in the detergent composition include, but are not limited to: carboxylates such as alkylcarboxylates and polyalkoxycarboxylates, alcohol ethoxylate carboxylates, nonylphenol ethoxylate carboxylates; sulfonates such as alkylsulfonates, alkylbenzenesulfonates, alkylarylsulfonates, sulfonated fatty acid esters; sulfates such as sulfated alcohols, sulfated alcohol ethoxylates, sulfated alkylphenols, alkylsulfates, sulfosuccinates, and alkylether sulfates. Exemplary anionic surfactants include, but are not limited to: sodium alkylarylsulfonate, alpha-olefinsulfonate, and fatty alcohol sulfates.

Non-limiting examples of nonionic surfactants useful in the detergent composition include, but are not limited to, those having a polyalkylene oxide polymer as a portion of the surfactant molecule. Such nonionic surfactants include, but are not limited to: chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated amines such as alkoxylated ethylene diamine; alcohol alkoxylates such as alcohol ethoxylate propoxylates, alcohol propoxylates, alcohol propoxylate ethoxylate propoxylates, alcohol ethoxylate butoxylates; nonylphenol ethoxylate, polyoxyethylene glycol ether; carboxylic acid esters such as glycerol esters, polyoxyethylene esters, ethoxylated and glycol esters of fatty acids; carboxylic amides such as diethanolamine condensates, monoalkanolamine condensates, polyoxyethylene fatty acid amides; and polyalkylene oxide block copolymers.

Non-limiting examples of cationic surfactants that can be used in the detergent composition include, but are not limited to: amines such as primary, secondary and tertiary monoamines with C18 alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl(C12-C18)dimethylbenzyl ammonium chloride, n-tetradecyldimethylbenzylammonium chloride monohydrate, and a naphthylene-substituted quaternary ammonium chloride such as dimethyl-1-naphthylmethylammonium chloride. The cationic surfactant can be used to provide sanitizing properties.

Non-limiting examples of zwitterionic surfactants that can be used in the detergent composition include, but are not limited to: betaines, imidazolines, and propionates.

In some aspects, where the detergent composition is intended to be used in an automatic dishwashing or warewashing machine, the surfactants selected, if any surfactant is used, can be those that provide an acceptable level of foaming when used inside a dishwashing or warewashing machine. It should be understood that warewashing compositions for use in automatic dishwashing or warewashing machines are generally considered to be low-foaming compositions.

When the detergent composition includes a surfactant as a cleaning agent, the cleaning agent is provided in an amount effective to provide a desired level of cleaning. In some embodiments, the compositions of the present invention include about 1 wt-% to about 50 wt-% of a surfactant. In other embodiments the compositions of the present invention include about 5 wt-% to about 45 wt-% of a surfactant. In still yet other embodiments, the compositions of the present invention include about 10 wt-% to about 45 wt-% of a surfactant, or from about 15 wt-% to about 45 wt-% of a surfactant.

Additional Functional Ingredients

The components of the detergent composition can further be combined with various functional components. In some embodiments, the solid, stabilized catalyst detergent composition including the polymer, catalyst, alkalinity source, active oxygen and/or surfactants make up a large amount, or even substantially all of the total weight of the detergent composition. For example, in some embodiments few or no additional functional ingredients are disposed therein.

In other embodiments, additional functional ingredients may be included in the compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning, specifically warewash and/or laundry applications. However, other embodiments may include functional ingredients for use in other applications.

In some embodiments, the compositions may include solvents, activating agents, defoaming agents, anti-redeposition agents, additional bleaching agents, solubility modifiers, dispersants, rinse aids, metal protecting agents, stabilizing agents, corrosion inhibitors, surface modification polymers, such as soil release polymers, starches, fluid repellants, whitening additives, such as optical brighteners or hueing agents, additional sequestrants and/or chelating agents, enzymes, fragrances and/or dyes, rheology modifiers or thickeners, hydrotropes or couplers, buffers, solvents and the like.

Solvents

In some embodiments, the compositions include a solvent to combine the catalyst and polymer into a mixture before drying to form the polymeric matrix coating. The combination of the catalyst and polymer can be by any means suitable for ensuring dispersal of the agents sufficient for the drying or evaporation steps disclosed according to the methods of making the detergent compositions.

In some aspects, the solvent is water. In other aspects, the solvent can include water and/or one or more polar or non-polar solvents. According to the invention, the solvents must be suitable for the drying or evaporation according to the methods of making the detergent compositions. Representative polar solvents include for example, water and alcohols (including straight chain or branched aliphatic alcohols, such as methanol), glycols and derivatives, and the like. Representative non-polar solvents include for example, aliphatics, aromatics, and the like.

Activating Agents

In some embodiments, the compositions include an activating agent to further increase the activity of the active oxygen source (e.g. percarbonate). Such an activating agent can be used in addition to the catalyst. Suitable activating agents include sodium-4-benzoyloxy benzene sulphonate (SBOBS); N,N,N',N'-tetraacetyl ethylene diamine (TAED); sodium-1-methyl-2-benzoyloxy benzene-4-sulphonate; sodium-4-methyl-3-benzoyloxy benzoate; SPCC trimethyl ammonium toluyloxy benzene sulphonate; sodium nonanoyloxybenzene sulphonate, sodium 3,5,5,-trimethyl hexanoyloxybenzene sulphonate; penta acetyl glucose (PAG); octanoyl tetra acetyl glucose and benzoyl tetracetyl glucose.

Chelants

In some embodiments, the compositions include a chelant/sequestering agent. Suitable chelating/sequestering agents are, for example, citrate, aminocarboxylic acid, condensed phosphate, phosphonate, and polyacrylate. In general, a chelating agent is a molecule capable of coordinating (i.e., binding) the metal ions commonly found in natural water to prevent the metal ions from interfering with the action of the other detersive ingredients of a cleaning composition. In general, chelating/sequestering agents can generally be referred to as a type of builder. The chelating/sequestering agent may also function as a threshold agent when included in an effective amount. The concentrated detergent composition can include 0.1 to 70% by weight, preferably 5 to 60% by weight, more preferably 5 to 50% by weight, most preferably 10 to 40% by weight of a chelating/sequestering agent.

Suitable aminocarboxylic acids include, for example, methylglycinediacetic acid (MGDA), N-hydroxyethyliminodiacetic acid, nitrilotriacetic acid (NTA), ethylenediaminetetraacetic acid (EDTA), N-hydroxyethyl-ethylenediaminetriacetic acid (HEDTA), and diethylenetriaminepentaacetic acid (DTPA). Examples of condensed phosphates include sodium and potassium orthophosphate, sodium and potassium pyrophosphate, sodium tripolyphosphate, sodium hexametaphosphate, and the like. A condensed phosphate may also assist, to a limited extent, in solidification of the composition by fixing the free water present in the composition as water of hydration. The composition may include a phosphonate such as 1-hydroxyethane-1,1-diphosphonic acid $CH_3C(OH)[PO(OH)_2]_2$ (HEDP); amino tri(methylenephosphonic acid) $N[CH_2PO(OH)_2]_3$; aminotri(methylenephosphonate), sodium salt $(NaO)(HO)P(OCH_2N[CH_2PO(ONa)_2]_2)$; 2-hydroxyethyl-iminobis(methylenephosphonic acid) $HOCH_2CH_2N[CH_2PO(OH)_2]_2$; diethylenetriaminepenta(methylenephosphonic acid) $(HO)_2POCH_2N[CH_2CH_2N[CH_2PO(OH)_2]_2]_2$; diethylenetriaminepenta(methylenephosphonate), sodium salt $C_9H_{(28-x)}N_3Na_xO_{15}P_5$ (x=7); hexamethylenediamine(tetramethylenephosphonate), potassium salt $C_{10}H_{(28-x)}N_2K_xO_{12}P_4$ (x=6); bis(hexamethylene)triamine(pentamethylenephosphonic acid) $(HO_2)POCH_2N[CH_2)_6N[CH_2PO(OH)_2]_2]_2$; and phosphorus acid $H_3PO_3$.

The chelating/sequestering agent may also be a water conditioning polymer that can be used as a form of builder. Exemplary water conditioning polymers include polycarboxylates. Exemplary polycarboxylates that can be used as water conditioning polymers include polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers. The concentrated detergent composition may include the water conditioning polymer in an amount of 0 to 20% by weight, preferably 0.1 to 5% by weight.

Defoaming Agents

In some embodiments, the compositions include a defoaming agent, which may be in addition to low or no-foaming surfactants. In some aspects, suitable defoaming agents include, for example, ethylene oxide/propylene block copolymers such as those available under the name Pluronic N-3, silicone compounds such as silica dispersed in polydimethylsiloxane, polydimethylsiloxane, and functionalized polydimethylsiloxane, fatty amides, hydrocarbon waxes, fatty acids, fatty esters, fatty alcohols, fatty acid soaps, ethoxylates, mineral oils, polyethylene glycol esters, and alkyl phosphate esters such as monostearyl phosphate.

Methods of Making

The polymeric matrix of the catalyst material is incorporated into a solid detergent formulation as described herein and referred to as the stabilized catalyst detergent composition. The catalyst, such as the manganese complex-based catalyst is beneficially formulated into a stable composition that contains an active oxygen component (e.g. bleaching compositions) and/or a highly alkaline detergent composition. The resultant solid, stabilized catalyst detergent compositions provide stability and homogeneity of distribution suitable for generation of use solutions according to the invention.

In some aspects, the solid detergent formulations are made by first combining the polymer and catalyst at the weight ratios disclosed according to the invention. In a further aspect, the polymer and catalyst are mixed to ensure homogenous distribution in a solution. In an alternative aspect, the polymer and catalyst are combined in an aqueous mixture or solution. In an aspect, the polymer may be dissolved into a solvent and/or the catalyst dissolved into a solvent and thereafter combined into an aqueous mixture. In a preferred aspect, there is complete dispersion of the catalyst within the polymer solution. The mixture may be heated as desired to ensure substantial dissolution of the polymer and/or catalyst.

Thereafter, the resulting solution of the polymer and catalyst is dried to allow water to evaporate. In an aspect, the drying of the polymer and catalyst solution forms a solid material having a water content of not more than about 20%, preferably not more than 15%, preferably not more than 10% by weight, and most preferably not more than 5% by weight, or dried. In an aspect, the drying step evaporates water and forms a crystalline structure, herein referred to as a polymeric matrix. The dried polymer and catalyst polymeric matrix may be in the form of granules.

As referred to herein, drying methods can include vacuum drying, drum-drying, band-drying, spray-drying, tray-drying or any combination thereof. In a preferred aspect, the drying step employs tray-drying or drum-drying such that the evaporation of water is less rapid than spray-drying or other techniques and allows the formulation of the crystalline structures, referred to as a polymeric matrix. Drum drying can include the spraying of the polymer and catalyst mixture on a turning drum, and turning at various speeds (e.g. speed of about 0.2 rpm) over a broad temperature range (e.g. at a temperature of above about 100° C.). Thereafter, upon evaporation of the water, the polymeric matrix is scraped or otherwise removed from the drum.

In some aspects, the evaporation process may be carried out in a few days to less than 1 hour, though preferably the evaporation process is carried out from about 1 hour to at least 5 hours. It is preferred to employ a longer drying or evaporation process to maintain the polymeric matrix structure. As a result, methods of tray drying and/or drum drying are preferred over spray drying, which often applies high heat over short periods of time such as little as 1 minute.

After the evaporation or drying process is complete, the polymeric matrix may optionally be subjected to additional heat or elevated temperatures to remove additional amounts of water remaining, if necessary, without altering the polymeric matrix structure.

The particulate product of the invention can be in the form of granules and/or flakes, but is preferably presented in the form of regular small granules. Thereafter, the granules are added to the detergent formulation and conventional hydrate solids are formed. In an aspect, ash and/or caustic hydration methods for solidification are employed to form the solid detergent formulations according to the invention. The solidification process may last from a few minutes to about six hours, depending on factors including, but not limited to: the size of the formed or cast composition, the ingredients of the composition, and the temperature of the composition.

The solid detergent compositions may be formed using a batch or continuous mixing system. In an exemplary embodiment, a single- or twin-screw extruder is used to combine and mix one or more cleaning agents at high shear to form a homogeneous mixture. In some embodiments, the processing temperature is at or below the melting temperature of the components. The processed mixture may be dispensed from the mixer by forming, casting or other suitable means, whereupon the detergent composition hardens to a solid form. The structure of the matrix may be characterized according to its hardness, melting point, material distribution, and other like properties according to known methods in the art. Generally, a solid detergent composition processed according to the method of the invention is substantially homogeneous with regard to the distribution of ingredients throughout its mass and is dimensionally stable.

By the term "solid," it is meant that the hardened composition will not flow and will substantially retain its shape under moderate stress or pressure or mere gravity. The degree of hardness of the solid cast composition may range from that of a fused solid product which is relatively dense and hard, for example, like concrete, to a consistency characterized as being a hardened paste. In addition, the term "solid" refers to the state of the detergent composition under the expected conditions of storage and use of the solid detergent composition. In general, it is expected that the detergent composition will remain in solid form when exposed to temperatures of up to approximately 100° F. and particularly up to approximately 120° F.

The resulting solid detergent composition may take forms including, but not limited to: a cast solid product; an extruded, molded or formed solid pellet, block, tablet, powder, granule, flake or the like. In certain embodiments, the solid detergent composition is provided in the form of a unit dose. A unit dose refers to a solid detergent composition unit sized so that the entire unit is used during a single washing cycle. When the solid detergent composition is provided as a unit dose, it is typically provided as a cast solid, an extruded pellet, or a tablet having a size of between approximately 1 gram and approximately 50 grams. In other embodiments, the solid detergent composition is provided in the form of a multiple-use solid, such as a block or a plurality of pellets, and can be repeatedly used to generate aqueous detergent compositions for multiple washing cycles. In certain embodiments, the solid detergent composition is provided as a cast solid, an extruded block, or a tablet having a mass of between approximately 5 grams and approximately 10 kilograms. The solid compositions provide for a stabilized source of functional materials, namely the stabilized catalysts. In some embodiments, the solid composition may be dissolved, for example, in an aqueous or other medium, to create a concentrated and/or use solution for use according to the various applications disclosed herein.

Methods of Use

In some aspects, the stabilized catalyst detergent compositions are suitable for use in various applications that requires protection of a catalyst material from other components in a formula (e.g. active oxygen sources and/or alkalinity). Without being limited according to the applications of use of the invention, the stabilized catalyst compositions are particularly suitable for the protection of oxidation catalysts in bleaching systems, such as for laundry and warewashing. In particular, the bleaching systems may include warewash detergents, coffee and/or tea destainers, clean-in-place (CIP) applications employing peroxygen activation catalysts for peroxide or peracid cleaners, surgical instrument cleaning and the like, laundry applications, and the like.

In a further aspect however, the stabilized catalyst compositions are suitable for protection of oxidation catalysts in wastewater treatment, epoxidation reactions, and many other applications. In such applications there is a need for the removal of microbes (e.g. wastewater treatment) from wastewater which is often rich in malodorous compounds of reduced sulfur, nitrogen, phosphorous and the like. In such aspects, detergent compositions containing a strong oxidant are employed to convert these compounds efficiently to their odor free derivatives e.g. the sulfates, phosphates and amine oxides. These same properties are very useful in the treatment of other water sources, including industrial applications (e.g. treatment of slick water and other applications customary in oil and/or gas drilling) where the property of bleaching is also of great utility.

In still further aspects, the stabilized catalyst compositions are suitable for protection of oxidation catalysts in pulp and paper bleaching. As referred to herein, pulp and paper bleaching may be employed in the "papermaking process," referring to methods of making paper products from pulp generally comprising forming an aqueous cellulosic papermaking furnish, draining the furnish to form a sheet and drying, the sheet. The steps of forming the papermaking furnish, draining, and drying may be carried out in any conventional manner generally known to those skilled in the art. The pulp may be any either or both of virgin pulp and recycled pulp.

In some aspects, the stabilized catalyst detergent compositions are preferably for use in an automatic washing detergent formulation e.g. such as a dishwasher detergent or a laundry detergent.

In some aspects, the detergent compositions are contacted by a diluent, such as water to generate a concentrate and/or use solution for the various applications of use. The detergent compositions can include concentrate compositions or can be diluted to form use compositions. In general, a concentrate refers to a composition that is intended to be diluted with water to provide a use solution that contacts an object to provide the desired cleaning, rinsing, or the like. The detergent composition that contacts the articles to be washed can be referred to as the use composition. The use solution can include additional functional ingredients at a level suitable for cleaning, bleaching, or the like.

A use solution may be prepared from the concentrate by diluting the concentrate with water at a dilution ratio that provides a use solution having desired detersive properties. The water that is used to dilute the concentrate to form the use composition can be referred to as water of dilution or a diluent, and can vary from one location to another. The typical dilution factor is between approximately 1 and approximately 10,000 but will depend on factors including water hardness, the amount of soil to be removed and the like. In one embodiment, the concentrate is diluted at a ratio of between about 1:10 and about 1:1000 concentrate to water. Particularly, the concentrate is diluted at a ratio of between about 1:100 and about 1:5000 concentrate to water.

In some aspects, the concentrate compositions according to the invention are provided in the dilution range of about 0.01 g/L to about 10 g/L, from about 0.1 g/L to 10 g/L, from about 0.2 g/L to 5 g/L, from about 0.5 g/L to 5 g/L, from about 0.5 g/L to 4 g/L, which will depend upon the dosing required for a particular application of use (e.g. warewash detergent, laundry detergent, or the like).

In some aspects, the use solutions according to the invention provide a desired level of catalyst from about 0.01 ppm to about 5 ppm, from about 0.02 ppm to about 5 ppm, from about 0.05 ppm to about 2 ppm.

In some aspects, the present invention provides methods for removing soils from a surface, e.g., a hard surface, and/or bleaching a surface. In some embodiments, the method comprises applying a use solution of the detergent composition (e.g. contacting) to the surface, and removing the composition from the surface after an amount of time sufficient to facilitate soil removal and/or bleaching. The contacting step can last for any suitable time. In some embodiments, the contacting step lasts for at least 10 seconds, 20 seconds, 30 seconds, 40 seconds, 50 seconds, 1 minute, 10 minutes, 30 minutes, 1 hour, 2 hours, 4 hours, 8 hours, 16 hours, 1 day, 3 days, 1 week, or longer. The detergent composition can be applied to the surface (or target for soil removal and/or bleaching) in any suitable manner. In some embodiments, the detergent composition is applied by means of a spray, a foam, or the like.

The methods can be used to achieve any suitable removal of soil (e.g. cleaning), sanitizing, disinfecting, bleaching and/or reduction of the microbial population in and/or on the surface or target. In some embodiments, the methods can be used to reduce the microbial population by at least one log 10. In other embodiments, the present methods can be used to reduce the microbial population in and/or on the target or the treated target composition by at least two log 10. In still other embodiments, the present methods can be used to reduce the microbial population in and/or on the target or the treated target composition by at least three log 10.

In some embodiments, the method further comprises rinsing the surface. In some embodiments, the method further comprises generating a bubbling effect of the detergent compositions containing the active oxygen source and catalyst (and/or an active oxygen source combined with the detergent composition containing the catalyst). In some embodiments, the method further comprises a mechanical application of force, agitation and/or pressure to assist in removing the soils and/or bleaching the surface.

The methods of the present invention can be used to remove a variety of soils from a variety of surfaces and/or bleaching a variety of surfaces. For example, surfaces suitable for cleaning using the methods of the present invention include, but are not limited to, walls, floors, ware, dishes, flatware, pots and pans, heat exchange coils, ovens, fryers, smoke houses, sewer drain lines, and the like.

In some embodiments, the methods of the present invention are followed by only a rinse step. In other embodiments, the methods of the present invention are followed by a conventional CIP method suitable for the surface to be cleaned. In still yet other embodiments, the methods of the present invention are followed by a CIP method such as those described in U.S. Pat. Nos. 8,398,781 and 8,114,222 entitled "Methods for Cleaning Industrial Equipment with Pre-treatment," both of which are hereby incorporated by reference in their entirety.

Beneficially, according to the various aspects, the methods protect peroxygen (or other active oxygen sources) from the catalysts formulated within the solid stabilized catalyst detergent compositions prior to a point of use. In other aspects, the methods protect the catalysts formulated within the solid stabilized catalyst detergent compositions from high alkalinity from the solid compositions prior to a point of use.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The following materials were employed in the Examples for exemplary embodiments of the polyacrylate coating materials and the catalyst materials.

Polyacrylates:

Acusol 448—Acrylic acid/maleic acid copolymer (50% active)

Acusol 445—Acrylic acid polymer (45% active)

Catalysts:

Manganese catalyst 1-bis(octahydro-1,4,7-trimethyl-1H-1,4,7-triazonine-k$N^1$, k$N^4$, k$N^7$)-tri-μ-oxo-Di[manganese (1+)] sulfate tetrahydrate Manganese catalyst 2-Di[manganese(1+)], 1,2-bis(octahydro-4,7-dimethyl-1H-1,4,7-triazonine-1-yl-k$N^1$, k$N^4$, k$N^7$)-ethane-di-μ-oxo-μ-(ethanoato-kO, kO')-, di[chloride (1−)]

Example 1

Various formulations of a solid peroxygen source contained in a solid detergent block composition along with a catalyst material were evaluated to determine whether the available oxygen and catalyst stability could be improved. The following formulations were evaluated to confirm the polymeric matrix method for improving catalyst and peroxygen source stability. Requirements for stability were further combined with need for the encapsulation or matrix to provide sufficient dissolution into a use solution. Cleaning performance efficacy should not be impacted by the polymeric matrix, demonstrating the need for sufficient water solubility of the polymer matrix material to ensure a sufficient dissolution rate.

The formulations shown in Table 3 were used to generate hydrate solids employing percarbonate formulations with commercially-available manganese catalysts surrounded by the polymer matrix.

TABLE 3

| Raw Material | Ash Hydrate Solid with Percarbonate Formula 1 | Ash Hydrate Solid with Percarbonate Formula 2 |
|---|---|---|
| Dense Ash | 36.34 | 36.34 |
| Metasilicate | 3.16 | 3.16 |
| Surfactant(s) | 5 | 5 |
| Sodium Percarbonate | 40 | 40 |
| Additional Functional Ingredients | 13 | 13 |

TABLE 3-continued

| Raw Material | Ash Hydrate Solid with Percarbonate Formula 1 | Ash Hydrate Solid with Percarbonate Formula 2 |
|---|---|---|
| Acusol 448-Matrix Coated Catalyst | 2.5 | |
| Acusol 445- Matrix Coated Catalyst | | 2.5 |
| Total | 100 | 100 |

The polymer matrix formulation employing the polyacrylate matrix surrounding the catalyst were formulated according to the following methods.

Acusol 448/manganese catalyst granule preparation: 0.833 g of manganese catalyst 1 (60% active) was dissolved in 50 g DI water. The manganese catalyst 1 solution was then slowly mixed into 48.33 g of Acusol 448 (50% active) raw material. The solution was stirred for 30 minutes to ensure complete incorporation of catalyst into the Acusol 448 solution. The solution was then dried in an oven at 50° C. for 1 week to remove water. The dried material was ground into a powder to form granules with ~2% active manganese catalyst.

Acusol 445/manganese catalyst granule preparation: The preparation of catalyst granules with Acusol 445 (45% active) was similar to granules with Acusol 448, but used 53.7 grams of Acusol 445 raw material so that the overall % active would still be ~2% active manganese catalyst.

Initial stability evaluation of Formulas 1 and 2 made of the ash hydrate solid showed these formulations employing polyacrylate (Acusol 448 or Acusol 445) matrixes provided sufficient stability and were therefore expected to maintain efficacy (i.e. no decline in performance) due to the water solubility of the polyacrylate. The formulations evaluated confirmed the need to limit the amount of water added to the formula to maintain peroxygen stability. The stability of the formulations suggested that excessive amounts of water (>5% in the formula) facilitate dissolution of the polyacrylate material and can cause premature reaction between the catalyst and the peroxygen source. In an aspect of the invention, the matrix coated catalysts contain less than about 5 wt-% water.

The formulations of this Example illustrate suitable warewash formulations for use with the encapsulated catalyst. The composition is suitable for formulation as a single detergent containing both the catalyst and active oxygen source (e.g. peroxide source).

Example 2

Additional formulations of a solid detergent block composition along with a catalyst material were evaluated to determine whether the catalyst could maintain stability within a highly alkaline composition. The solid peroxygen source was not included in these formulations; high alkalinity stability was evaluated as these conditions are also known to cause stability limitations for catalyst materials. The formulations shown in Table 4 were used to generate hydrate solids having high alkalinity (e.g. caustic formulations) with the manganese catalyst 2 surrounded by the polymer matrix.

TABLE 4

| Raw Material | Caustic Hydrate Solid |
|---|---|
| NaOH (50%) | 17.99 |
| Water | 1.95 |
| Caustic Bead | 34.60 |
| Dense Ash | 7.22 |
| Surfactants | 13.16 |
| Additional Functional Ingredients | 22.58 |
| Acusol 445-Matrix Coated Catalyst | 2.50 |
| Total | 100 |

The polymer matrix formulation employing the polyacrylate matrix surrounding the catalyst were formulated according to the following methods.

Acusol 445/manganese catalyst granules: 0.5 g of manganese catalyst 2 (50% active) was dissolved in 25 g DI water. The manganese catalyst 2 solution was then slowly mixed into 26.66 g of Acusol 445 (45% active) raw material. The solution was stirred for 30 minutes to ensure complete incorporation of catalyst into the Acusol 445 solution. The solution was then dried in an oven at 50° C. for 1 week to remove water. The dried material was ground into a powder to form granules with ~2% active manganese catalyst.

Initial stability evaluation of the caustic hydrate solid showed the formulation employing polyacrylate (Acusol 445) matrix provided sufficient stability and were therefore expected to maintain efficacy (i.e. no decline in performance) due to the water solubility of the polyacrylate. Beneficially, the catalyst was stable when incorporated into the high alkaline detergent composition. Although the exemplary laundry detergent formulation does not contain the peroxide source (as employed in Example 1), the uncoated catalyst material requires enhanced stability under the high alkaline environment. By incorporating the catalyst into the polyacrylate matrix, the catalyst is protected from the high alkalinity.

The formulation of this Example illustrates suitable laundry detergent formulation for use with matrix coated manganese catalyst. The catalyst can be incorporated into a high alkaline detergent; optionally the active oxygen source can be introduced (e.g. peroxide) through another product. Without being limited according to the invention, the manganese catalyst 2 is employed as the catalyst material for use as a bleaching catalyst in laundry applications due to its improved linen damage profile compared to the manganese catalyst 1. Beneficially, the matrix coated catalyst shows good stability in a high caustic formula.

Example 3

Still further formulations of a solid detergent block composition along with a catalyst material were evaluated to determine whether the catalyst could maintain stability within a highly alkaline composition containing a high surfactant concentration. The solid peroxygen source was not included in these formulations. The formulations shown in Table 5 were used to generate hydrate solids having high alkalinity (e.g. caustic formulations) with the manganese catalyst 2 surrounded or coated by the polymer matrix.

TABLE 5

| Raw Material | Ash Based Hydrate Solid |
|---|---|
| Sodium Carbonate Natural Light | 32.58 |
| Ash Monohydrate | 10.34 |
| Surfactant | 40.48 |
| Additional Functional Ingredients | 14.13 |
| Acusol 445-Matrix Coated Catalyst | 2.5 |
| Total | 100 |

The polymer matrix formulation employing the polyacrylate matrix surrounding the catalyst were formulated according to the following methods described in Example 2. Initial stability evaluation of the caustic hydrate solid showed the formulation employing polyacrylate (Acusol 445) matrix provided sufficient stability and were therefore expected to maintain efficacy (i.e. no decline in performance) due to the water solubility of the polyacrylate. Beneficially, the catalyst was stable when incorporated into the high alkaline detergent composition including a high concentration of surfactants.

The formulation of this Example illustrates suitable laundry detergent formulation for use with encapsulated manganese catalyst. The catalyst can be incorporated into a high alkaline detergent containing surfactants; optionally the active oxygen source can be introduced (e.g. peroxide) through another product. Beneficially, the encapsulated catalyst shows good stability in a high surfactant ash-based detergent.

Example 4

Additional studies were conducted to quantify the stability of the hydrate solid detergent formulations incorporating percarbonate with the manganese catalyst 1 surrounded by the polymer matrix—evaluating both Acusol 448 and Acusol 445 polymers.

The formulations of Table 6 were employed to measure the amount of available oxygen formulations using the following formulations with/without Acusol 448 as the polymer matrix: formulations containing no catalyst (Formula A—No Catalyst), formulations containing the polymer and fresh catalyst added at a point of use at each point of measurement (Formula A—Added Fresh Catalyst), formulations containing the polymer and catalyst (Formula B—Uncoated Catalyst), and containing the polymer matrix surrounding the catalyst (Formula C—Matrix Coated Catalyst). The available oxygen of the sodium percarbonate formulations was measured through an iodometric titration. The available oxygen values were used to evaluate the stability of formulations containing both sodium percarbonate and catalyst.

TABLE 6

| Raw Material | Formula A | Formula B | Formula C |
|---|---|---|---|
| Dense Ash | 36.84 | 36.7567 | 34.34 |
| Metasilicate | 3.16 | 3.16 | 3.16 |
| Surfactant | 5 | 5 | 5 |
| Sodium Percarbonate | 40 | 40 | 40 |
| Additional Functional Ingredients | 15 | 15 | 15 |
| Manganese catalyst 1 (60% active) (non-coated catalyst) | | 0.0833 | |
| Acusol 448-coated manganese catalyst 1 (matrix coated catalyst) | | | 2.5 |
| Total | 100 | 100 | 100 |

Table 7 shows the percentage available oxygen (of theoretical value of percarbonate available oxygen) at each time measurement during the experiment. The measurements of both 40° C. and 50° C. show that despite elevated temperatures the Formulation 3 having the polymeric matrix coated catalyst shows available oxygen levels similar to formulation 1, which contains no catalyst.

TABLE 7

| Formula | Initial-RT | 2 weeks-40° C. | 2 weeks-50° C. | 4 weeks-RT | 4 weeks-40° C. | 4 weeks-50° C. |
|---|---|---|---|---|---|---|
| 1-No Catalyst | 98.60 | 93.25 | 91.18 | 92.94 | 97.68 | 80.62 |
| 2-Uncoated Catalyst | 93.31 | 84.39 | 65.69 | 88.97 | 67.64 | 31.21 |
| 3-Matrix Coated Catalyst | 96.04 | 93.52 | 89.90 | 95.20 | 92.41 | 75.43 |

The formulations of Table 8 were employed to measure the amount of available oxygen formulations and cleaning efficacy using the following formulations with/without Acusol 445 as the polymer matrix: formulations containing no catalyst (Formula 1—No Catalyst), formulations containing the polymer and fresh catalyst added at a point of use at each point of measurement (Formula 1—Added Fresh Catalyst), formulations containing the polymer and catalyst (Formula 2—Uncoated Catalyst), and containing the polymer matrix surrounding the catalyst (Formula 3—Matrix Coated Catalyst).

TABLE 8

| Raw Material | Formula 1 | Formula 2 | Formula 3 |
|---|---|---|---|
| Dense Ash | 36.34 | 36.34 | 36.34 |
| Metasilicate | 3.16 | 3.16 | 3.16 |
| Surfactant | 5 | 5 | 5 |
| Sodium Percarbonate | 40 | 40 | 40 |
| Additional Functional Ingredients | 15.5 | 15.42 | 13 |
| Manganese catalyst 1 (non-coated catalyst) | | 0.083 | |
| Acusol 445-Mn catalyst 1 (matrix coated catalyst) | | | 2.5 |
| Total | 100 | 100 | 100 |

Table 9 shows the percentage available oxygen (of theoretical value) at each time measurement during the experiment. The measurements of 40° C. show that despite elevated temperatures the Formulation 3 having the polymeric matrix coated catalyst retains available oxygen in the solid formulations.

TABLE 9

| Formula | Initial - RT | 2 weeks - RT | 2 weeks - 40° C. | 4 weeks - RT | 4 weeks - 40° C. |
|---|---|---|---|---|---|
| 1 - No Catalyst | 100.58 | 99.00 | 97.22 | 100.29 | 97.11 |
| 2 - Uncoated Catalyst | 101.22 | 97.73 | 69.75 | 93.07 | 49.83 |
| 3 - Matrix Coated Catalyst | 100.41 | 99.19 | 94.60 | 97.84 | 91.16 |

In addition, the stability comparisons of the formulations set forth in Table 8 are shown in FIG. 1. The methods employed for measuring the percentage of stain removal at an initial point of use, at 2 weeks and again at 4 weeks (each measurement at both room temperature and 40° C.) as set forth below describing the tea swatch bleaching using a tergotometer.

Unwashed swatches from the lot numbers to be used in the test are read on the HunterLab Color Quest Spectrophotometer to establish the average initial (before washing) L value. A sampling of 25 of each swatch type is used. The desired wash temperature is programmed into the tergotometer and its water bath is allowed to heat up to that temperature. One liter of the desired water type is added to each tergotometer pot and allowed to equilibrate to the desired temperature. The detergent systems are weighed out and added to the tergotometer pots. The detergent systems are agitated for 2 minutes to mix and dissolve. The swatches are added quickly to their respective pots in a left to right sequence in order to minimize differences in exposure time to the detergent systems. Agitation is begun immediately after adding swatches. At the end of the run, the swatches are removed from the pots quickly in a left to right sequence using a forceps and are transferred into 500 mls-1 liter of cold water to rinse. One container of cold rinse water is used for each pot. The swatches are removed from the cold water and are further rinsed under cold tap water using a strainer or colander in a sink. After rinsing with cold tap water, squeeze the excess water from the swatches. Repeat the rinse and squeeze process 2 more times. Air dry the swatches on a napkin or paper towel (or place swatches in a tightly sealed mesh bag and dried in a lab dryer). The swatches are read on the HunterLab Color Quest and % soil removal is calculated from the difference between the initial (before washing) L value and the final L value (after washing).

As shown, the polymer matrix coated catalyst according to the invention (shown as Formula 3) provides superior cleaning efficacy (as related to the percentage of available oxygen over time as discussed in Table 7). The cleaning efficacy of Formula 3 is comparable to the formulation 1 having fresh catalyst added at a point of use, demonstrating that the stability of the hydrate solid formulations maintains activity of both the active oxygen source and the catalyst during storage, including at elevated temperatures.

The results show that using a matrix coating for the catalyst with the polyacrylate material effectively keeps it from reacting with the peroxide in the solid detergent block (such as would occur during storage and/or transportation). This yields at least a two-time improvement in bleaching efficacy by including a coated catalyst to the bleaching compositions. Beneficially, the coated catalyst showed excellent stability in the active oxidant formulations. Still further, the polyacrylate coating readily dissolved during use conditions for applications of use.

Example 5

Additional studies were conducted to quantify the stability of the hydrate solid caustic laundry formulations incorporating caustic with manganese catalysts surrounded by the polymer matrix—evaluating Acusol 445 as the polymeric material.

The formulations of Table 10 were employed to measure the efficacy of stain removal using the following formulations with/without Acusol 445 as the polymer matrix: formulations containing no catalyst (Formula 4—No Catalyst), formulations containing the polymer and fresh catalyst added at a point of use at each point of measurement (Formula 4—Added Fresh Catalyst), formulations containing the polymer and catalyst (Formula 5—Uncoated Catalyst), and containing the polymer matrix surrounding the catalyst (Formula 6—Matrix Coated Catalyst).

TABLE 10

| Description | Formula 4 | Formula 5 | Formula 6 |
|---|---|---|---|
| NaOH (50%) | 18.45 | 18.45 | 17.99 |
| water | 2 | 2 | 1.95 |
| Caustic Bead | 35.5 | 35.5 | 34.61 |
| Dense Soda Ash | 7.4 | 7.3 | 7.22 |
| Surfactant | 13.5 | 13.5 | 13.16 |
| Additional Functional Ingredients | 23.15 | 23.15 | 22.58 |
| Manganese Catalyst 2 (50% active) (non-coated catalyst) | — | 0.1 | — |
| Manganese Catalyst 2/Acusol 445 (2% active) (matrix coated catalyst) | — | — | 2.50 |
| Total | 100 | 100 | 100 |

Figure 2:
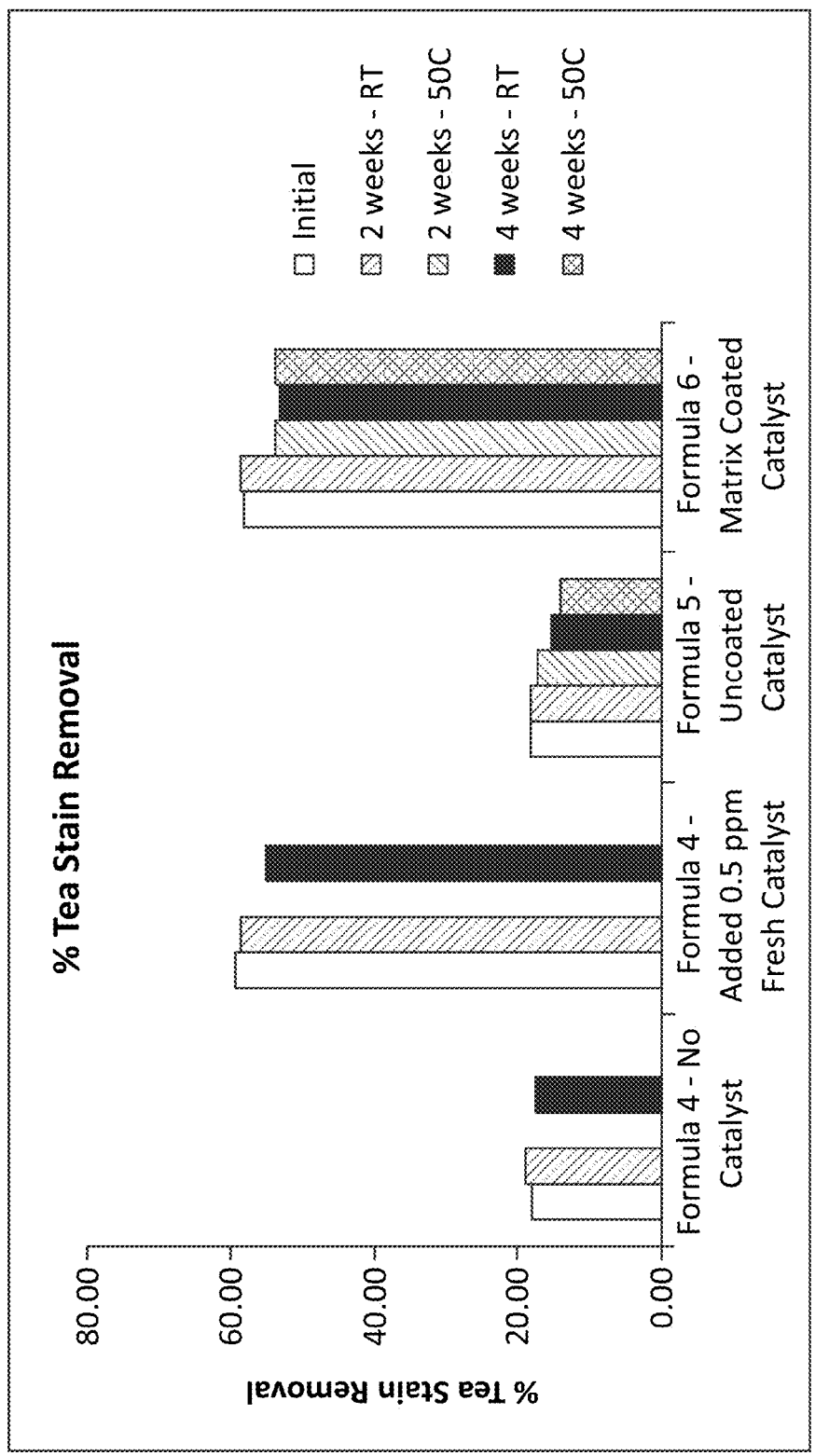

The efficacy comparisons of the formulations set forth in Table 10 are shown in FIG. 2 as measuring the percentage of stain removal at an initial point of use, at 2 weeks and again at 4 weeks (each measurement at both room temperature and 50° C.). As shown, the polymer matrix coated catalyst according to the invention (shown as Formula 6) provides superior cleaning efficacy to the composition of Formula 4 without a catalyst and the uncoated catalyst of Formula 5. The cleaning efficacy of Formula 6 is comparable to the formulation 4 having fresh catalyst added at a point of use, demonstrating that the stability of the hydrate caustic solid formulations maintains activity of the catalyst despite the high alkalinity conditions of the laundry formulation during storage, including at elevated temperatures.

The results further show that coating of the catalyst in the polyacrylate material effectively keeps it from reacting with the highly alkaline laundry bleaching components in the solid detergent block (such as would occur during storage and/or transportation). This yields at least a three-time improvement in stain removal efficacy by including a coated catalyst to the bleaching compositions. Beneficially, the encapsulated catalyst showed excellent stability in high alkaline laundry formulations. Still further, the polyacrylate matrix coating readily dissolved during use conditions for applications of use.

Example 6

Additional studies were conducted to quantify the stability of the hydrate solid ash-based laundry formulations incorporating the manganese catalysts surrounded by the polymer matrix—evaluating Acusol 445 as the polymeric material.

The formulations of Table 12 were employed to measure the efficacy of stain removal using the following formulations with/without Acusol 445 as the polymer matrix: formulations containing no catalyst (Formula 7—No Catalyst), formulations containing the polymer and fresh catalyst added at a point of use at each point of measurement (Formula 7—Added Fresh Catalyst), formulations containing the polymer and catalyst (Formula 8—Uncoated Catalyst), and containing the polymer matrix surrounding the catalyst (Formula 9—Matrix Coated Catalyst).

TABLE 12

| Description | Formula 7 | Formula 8 | Formula 9 |
|---|---|---|---|
| Sodium Carbonate Natural Light | 33.412 | 33.312 | 30.912 |
| Ash Monohydrate | 10.604 | 10.604 | 10.604 |
| Surfactant | 41.5 | 41.5 | 41.5 |
| Additional Functional Ingredients | 14.48 | 14.48 | 14.48 |
| Manganese catalyst 2 (50% active) (non-coated catalyst) | — | 0.1 | — |
| Manganese catalyst 2/Acusol 445 (2% active) (matrix coated catalyst) | — | — | 2.5 |
| Total | 100 | 100 | 100 |

Figure 3:
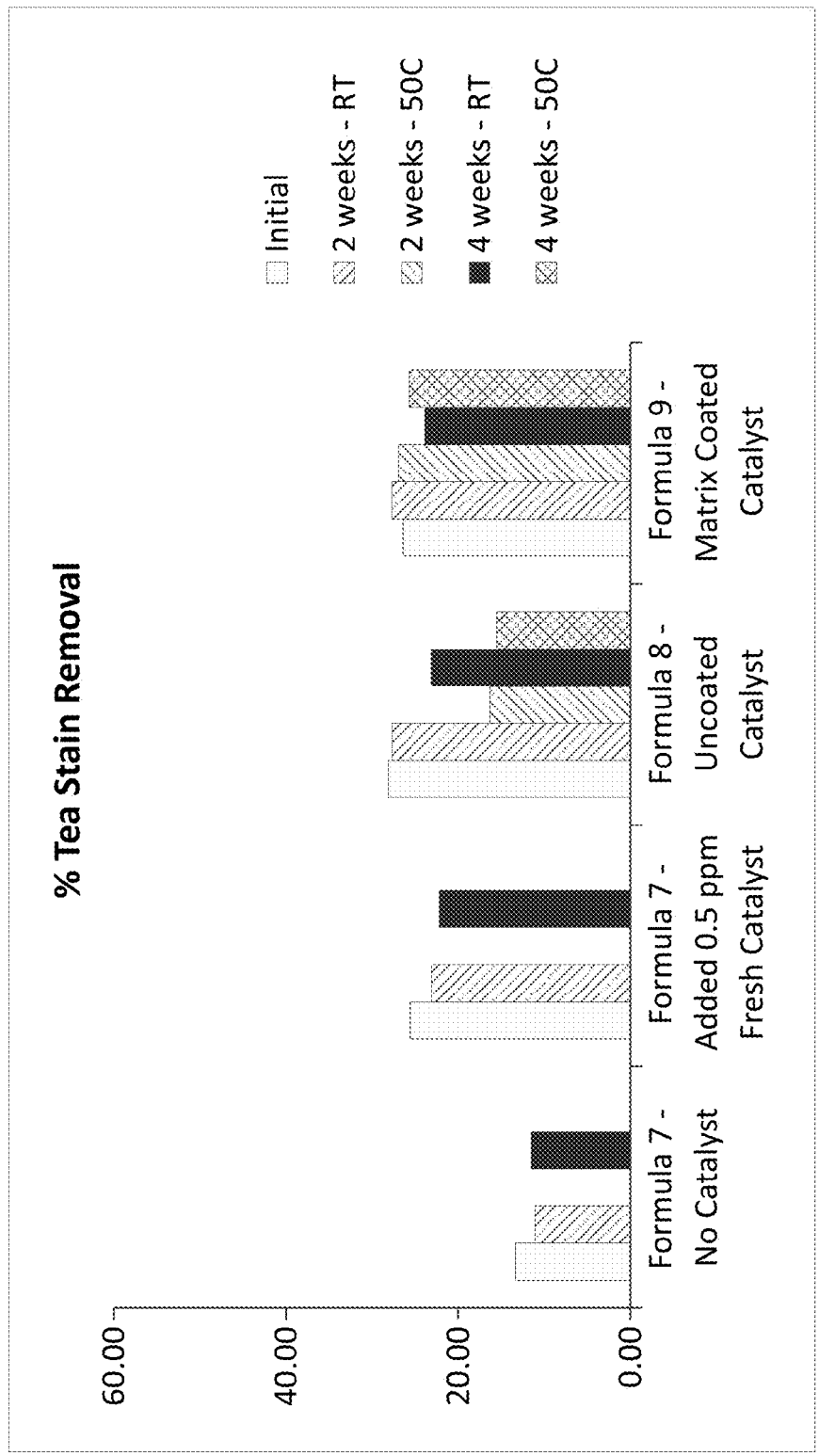

The efficacy comparisons of the formulations set forth in Table 12 are shown in FIG. 3 as measuring the percentage of stain removal at an initial point of use, at 2 weeks and again at 4 weeks (each measurement at both room temperature and 50° C.). As shown, the polymer matrix coated catalyst according to the invention (shown as Formula 9) provides at least substantially similar cleaning efficacy or superior cleaning efficacy to the composition of Formula 8 with the uncoated catalyst. The cleaning efficacy of Formula 9 is also comparable to the formulation 7 having fresh catalyst added at a point of use, demonstrating that the stability of the hydrate ash based solid formulations that maintain activity of the catalyst despite the high alkalinity conditions of the laundry formulation during storage, including at elevated temperatures.

The results further show that coating of the catalyst in the polyacrylate material effectively keeps it from reacting with the highly alkaline laundry bleaching components in the solid detergent block (such as would occur during storage and/or transportation). This yields at least a three-time improvement in stain removal efficacy by including a coated catalyst to the bleaching compositions. Beneficially, the coated catalyst showed excellent stability in high alkaline laundry formulations. Still further, the polyacrylate matrix coating readily dissolved during use conditions for applications of use.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A solid stabilized catalyst detergent composition comprising:
   at least one alkalinity source;
   a stabilized catalyst consisting essentially of a polymeric matrix of a polymer and a catalyst according to the following formula: $[(L_pMn_q)_nX_r]Y_s$, wherein the polymer is a water-soluble carboxylate comprising an acrylic acid/maleic acid copolymer, an acrylic acid polymer, polyvinylpyrrolidone polymer, or combinations thereof,
   wherein each L independently is an organic ligand containing at least three nitrogen atoms and/or at least two carboxyl groups that coordinate with the Mn metal;
   wherein each X independently is a coordinating or bridging group selected from the group consisting of $H_2O$, OH⁻, SH⁻, HO₂⁻, O²⁻, O₂²⁻, S²⁻, F⁻, Cl⁻, Br⁻, I⁻, NO₃⁻, NO₂⁻, SO₄²⁻, SO₃²⁻, PO₄³⁻, N₃⁻, CN⁻, NR₃, NCS⁻, RCN, RS⁻, RCO₂⁻, RO⁻, and

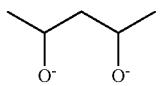

wherein R is a hydrogen or a $C_1$ to $C_6$ alkyl group;
wherein p is an integer from 1 to 4;
wherein q is an integer from 1 to 2;
wherein r is an integer from 0 to 6;
wherein Y is a counter ion; and
wherein s is the number of counter ions,
wherein said solid stabilized catalyst detergent composition is a solid block composition, and
wherein the weight ratio of the polymer to the catalyst is from 20:1 to about 99.9:0.1 in the polymeric matrix.

2. The detergent composition according to claim 1, wherein the polymer is a water-soluble carboxylate having a molecular weight between about 1,000 to 10,000.

3. The detergent composition according to claim 1, wherein the catalyst is a complex according to the following formula:

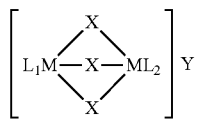

wherein M is Mn; wherein $L_1$ and $L_2$ are separate ligands or wherein $L_1$ and $L_2$ can combine to be a single molecule.

4. The detergent composition according to claim 1, wherein the alkalinity source is selected from the group consisting of alkali metal hydroxides, alkali metal carbonates, alkali metal silicates, alkali metal metasilicates, alkali metal bicarbonates, alkali metal sesquicarbonates, and combinations thereof.

5. The detergent composition according to claim 4, wherein the composition has a use pH of at least about 8.5.

6. The detergent composition according to claim 4, wherein the composition has a use pH of at least about 12.

7. The detergent composition according to claim 1, further comprising an active oxygen source that is catalyzed by the catalyst in a use solution of the composition.

8. The detergent composition according to claim 7, wherein the active oxygen source is selected from the group consisting of peroxygen compounds, peroxygen compound adducts, hydrogen peroxide, hydrogen peroxide liberating or generating compounds, inorganic or organic peroxyacids, peroxycarboxylic acids, percarbonates and combinations thereof.

9. The detergent composition according to claim 8, wherein the active oxygen source is sodium percarbonate.

10. The detergent composition according to claim 1, comprising from about 10-90 wt-% of the alkalinity source, from about 0.1-15 wt-% of the stabilized catalyst, from about 2-75 wt-% of an active oxygen source, from about 1-25 wt-% of at least one surfactant, and from about 1-30 wt-% of at least one additional functional ingredient.

11. A method of making a solid block stabilized catalyst detergent composition comprising:

providing a polymer in a solvent, wherein the polymer is a water-soluble carboxylate comprising an acrylic acid/maleic acid copolymer, an acrylic acid polymer, polyvinylpyrrolidone polymer, or combinations thereof;
providing a catalyst in a solvent, wherein the catalyst has the following formula: $[(L_pMn_q)_nX_r]Y_s$, wherein each L independently is an organic ligand containing at least three nitrogen atoms and/or at least two carboxyl groups that coordinate with the Mn metal; wherein each X independently is a coordinating or bridging group selected from the group consisting of H₂O, OH⁻, SH⁻, HO₂⁻, O²⁻, O₂², S²⁻, F⁻, Cl⁻, Br, I⁻, NO₃⁻, NO₂⁻, SO₄²⁻, SO₃²⁻, PO₄³⁻, N₃⁻, CN⁻, NR₃, NCS⁻, RCN, RS⁻, RCO₂⁻, RO⁻, and

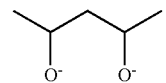

wherein R is a hydrogen or a $C_1$ to $C_6$ alkyl group; wherein p is an integer from 1 to 4; wherein q is an integer from 1 to 2; wherein r is an integer from 0 to 6; wherein Y is a counter ion; and wherein s is the number of counter ions;
combining the polymer and catalyst to form a solution;
drying the solution of the polymer and catalyst to form a stabilized catalyst polymeric matrix;
solidifying the stabilized catalyst polymeric matrix with at least one alkalinity source to form a hydrate solid block detergent composition,
wherein the weight ratio of the polymer to the catalyst is from 20:1 to about 99.9:0.1 in the polymeric matrix.

12. The method according to claim 11, wherein the solvent is water, and further comprising solidifying the catalyst with at an active oxygen source, a surfactant(s) and/or at least one additional functional ingredient.

13. The method according to claim 12, wherein the hydrate solid detergent composition comprises from about 10-80 wt-% of the alkalinity source, from about 0.1-15 wt-% of the stabilized catalyst polymeric matrix, from about 10-75 wt-% of the active oxygen source, from about 1-25 wt-% of the surfactant, and from about 1-30 wt-% of the at least one additional functional ingredient.

14. A method of cleaning and/or bleaching comprising:
providing the solid stabilized catalyst detergent composition of claim 1;
generating a use solution of the detergent composition; and
contacting a surface or object in need of cleaning and/or bleaching with the use solution of the detergent composition.

15. The method according to claim 14, wherein the use solution of the detergent composition is employed in a warewashing and/or laundry application.

16. The method according to claim 14, wherein the use solution of the detergent composition is employed in a pulp and/or paper bleaching, wastewater treatment and/or epoxidation reaction application.

17. The method according to claim 14, wherein the solid stabilized catalyst detergent composition maintains stability of the catalyst while formulated into the alkaline detergent composition.

18. The method according to claim 14, wherein the solid stabilized catalyst detergent composition is a caustic and/or carbonate detergent and optionally includes an active oxygen source to provide bleaching benefits with the stabilized catalyst.

\* \* \* \* \*